Patented June 1, 1954

2,680,092

UNITED STATES PATENT OFFICE 2,680,092

PHOTOCHEMICAL PRODUCTION OF CHLORAL

John W. Churchill, Kenmore, and Benjamin B. Schaeffer, Niagara Falls, N. Y., assignors to Mathieson Chemical Corporation, a corporation of Virginia No Drawing. Application January 15, 1952, Serial No. 266,607

2 Claims. (Cl. 204—158)

This invention relates to an improved process for the manufacture of chloral hydrate and chloral. More particularly, it relates to the manufacture of chloral from an ethyl ether such as beta, beta'-dichlorodiethyl ether by means of chlorination in the aqueous phase.

Chloral hydrate is usually manufactured by the chlorination of ethanol or by the chlorination of acetaldehyde or paraldehyde. Anhydrous chloral is prepared in a second step from the intermediate acetals by sulfuric acid hydrolysis in the case of ethanol chlorination and by dehydration of chloral hydrate in the case of acetaldehyde or paraldehyde chlorination in the presence of water.

We have found that beta, beta'-dichlorodiethyl ether may be chlorinated under appropiately controlled conditions to produce chloral or chloral hydrate in good yield by a combined chlorination and oxidation reaction. According to our invention beta, beta'-dichlorodiethyl ether is reacted with chlorine in the presence of light and in the presence of at least the stoichiometric proportion of water necessary to form chloral. The reaction may be conducted with other ethyl ethers, for example diethyl ether itself but we have found that beta, beta'-dichlorodiethyl ether offers special advantages as the starting material. The yields are good and the ultimate consumption of chlorine is better than in the case of ethyl ethers in a lower state of chlorination. Both chlorethyl radicals react to produce chloral so that by means of temperature control and by providing sufficient time for completion of the reaction yields are high. By contrast, with mixed ethyl or chlorethyl ethers such as methyl ethyl ether, the theoretical molar yield is halved. Moreover, since beta, beta'-dichlorodiethyl ether is high boiling, no special precautions are necessary in the chlorination process to avoid volatilization losses and the product may be recovered readily by conventional means such as blowing off the gases and by distillation.

Moreover beta, beta'-dichlorodiethyl ether is frequently cheaper than ethanol, acetaldehyde or paraldehyde. It is produced in sizeable quantities as a by-product of the ethylene chlorohydrin process in glycol manufacture and thus is available in impure by-product form at low cost to operators of this process. We have found that the by-product material can be utilized with advantage in chloral manufacture. The major contamination is due to water and the presence of acetaldehyde, but water is necessary to complete the reaction and acetaldehyde is chlorinated under the reaction conditions to produce additional chloral.

When chloral hydrate is the desired product, sufficient water is added to the starting material to provide for the hydration of the chloral, taking into account any water formed in the oxidation reaction. More than the minimum theoretical amount of water may be added, for example, the ratio may appropriately vary from one up to six or more moles of water per mole of ether. When the proportion of water to ether is appropriately limited, chloral itself may be obtained as a product.

The reactions involved for the formation of chloral and chloral hydrate from beta, beta'-dichlorodiethyl ether may be as follows:

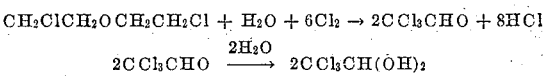
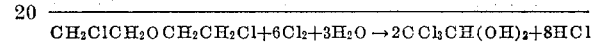

The chlorination is conducted by contacting the starting material and the appropriate amount of water with chlorine in the presence of visible or ultraviolet light. The reaction proceeds in the absence of added catalyst. The reaction temperature is allowed to rise slowly over a period of hours to a maximum of about 95° C. near the end of the reaction. Usually about 15 to 25 hours is required to complete the chlorination and oxidation reaction. Higher temperatures may be used under super-atmospheric pressures. The product is recovered from the reaction mixture by conventional means including the steps of blowing the mixture free of hydrogen chloride and excess chlorine with a stream of gas, for example, air or nitrogen, and distilling the chloral. For many purposes the blown reaction mixture is satisfactory without further treatment for the reaction of its chloral content in subsequent preparations.

Example I

A mixture comprising 2 moles of technical grade beta, beta'-dichlorodiethyl ether and 8 moles of water was chlorinated in the light of a tungsten bulb in a reactor fitted with light and thermometer wells, stirrer, condenser, gas inlet and outlet. The outlet of the condenser led to a cold trap for condensing entrained products in the effluent gases. The trap was maintained at approximately —5 to —15° C. Chlorine was introduced at the rate of 3.5 grams per minute. The temperature was 42 to 46° C. during an initial exothermic period of 8 hours after which it was raised to 82 to 88° C. for an additional 9½ hours. The chlorine efficiency initially was 68.8% which gradually decreased over a period of 17½ hours when the reaction was considered nearly complete. The homogeneous reaction mixture was blown with nitrogen to remove hydrogen chloride and excess chlorine. The yield of chloral was 55.6% calculated from the amount of chloroform obtained when a weighed sample of the crude product was hydrolyzed with 10% of aqueous sodium hydroxide.

*Example II*

A mixture of 2 moles of technical grade beta,beta'-dichlorodiethyl ether and 12 moles of water was chlorinated as described in Example I. Chlorine was introduced at the rate of 4.5 grams per minute. The temperature was 48 to 75° C. without the application of external heat during the first 7 hours of chlorination, after which it was increased to 88 to 90° C. for an additional 8-hour period. The chlorine efficiency initially was 45.5% and slowly decreased over a period of 15 hours. The homogeneous reaction mixture was purged with nitrogen to remove dissolved chlorine and hydrogen chloride, and the resulting colorless solution was analyzed for chloral by hydrolysis of a weighed sample with 10% aqueous sodium hydroxide. The yield of chloral was calculated as 42.5%, based on the quantity of chloroform formed as hydrolysis product.

*Example III*

Beta,beta'-dichlorodiethyl ether, technical grade, was chlorinated in a glass reactor tube in which was placed a 36-inch by 1-inch, 30-watt, "black light" fluorescent tube. The reaction mixture was circulated through an annular space between the fluorescent light and an outer jacket which provided means of cooling or heating the liquid reactants. The reactants were circulated from a reservoir to the tube-reactor and returned by means of an all-glass pump located in the liquid line.

A mixture comprising 10 moles of technical grade beta,beta'-dichlorodiethyl ether and 40 moles of water was chlorinated in this reactor at a feed rate of 7.5 grams of chlorine per minute. The reaction temperature during the initial exothermic period of 4 hours was 53 to 57° C. after which steam was applied for an additional 21 hours to maintain the temperature at 86.0 to 88.5° C. The initial chlorine efficiency was 80.2% which gradually decreased over a total reaction time of 25 hours. The solution was then drained to the reservoir and blown with nitrogen to remove dissolved gases. The crude product analyzed for chloral content by the method described in Example I, amounted to a yield of 57.3%.

*Example IV*

Technical grade dichlorodiethyl ether was distilled through a Podbielniak fractionating column obtaining beta,beta'-dichlorodiethyl ether boiling at 65° C. and 7 mm. of mercury pressure; $n_D^{25}$ 1.4540. A mixture of 2 moles of the fractionated ether and 8 moles of water was chlorinated with an average feed rate of 4.4 grams of chlorine per minute illuminated as in Example I. During the initial exothermic period the reaction temperature was 53 to 67° C. for the first 7½ hours after which it was raised to 93 to 95° C. for an additional 15½ hours. The chlorine efficiency started at 86.9% and slowly decreased. After a total reaction time of 23 hours the chlorination was practically complete. The solution was purged of dissolved chlorine and hydrogen chloride by blowing with nitrogen and the resulting colorless solution was analyzed as in Example I. The yield of chloral was 56%.

*Example V*

A mixture comprising 2 moles of fractionated beta,beta'-dichlorodiethyl ether boiling at 65° C. at 7 mm. pressure of mercury, and 12 moles of water was chlorinated in the apparatus described in Example I with tungsten light illumination. Chlorine was fed at an average rate of 4.5 grams per minute. The temperature range during the first 8 hours of the reaction was 50 to 70° C. which was increased to 93 to 94° C. for an additional 14-hour period. The maximum chlorine efficiency was 71.4% which gradually decreased over a total time of 22 hours when the chlorination was stopped. After blowing the homogeneous solution with nitrogen to remove excess chlorine and by-product hydrogen chloride, the crude product was analyzed as in Example I. The yield of chloral was 49.8%.

We claim:

1. The process which comprises reacting beta,beta'-dichlorodiethyl ether with chlorine in the presence of light and in an aqueous phase containing at least the stoichiometric proportion of water necessary to form chloral and conducting the chlorination for sufficient time to form chloral.

2. The process which comprises reacting beta,beta'-dichlorodiethyl ether with chlorine in the presence of light and in an aqueous phase containing at least 3 moles of water per mole of ether starting material, conducting the chlorination for sufficient time to form chloral and recovering chloral hydrate from the reaction mixture.

References Cited in the file of this patent

UNITED STATES PATENTS

| Number | Name | Date |
|---|---|---|
| 2,478,152 | Cass | Aug. 2, 1949 |

OTHER REFERENCES

Wurtz et al., Comptes Rendues, vol. 74 (1872), pp. 777–780.